US005728794A

United States Patent [19]

Friebe et al.

[11] Patent Number: 5,728,794
[45] Date of Patent: Mar. 17, 1998

[54] PROCESS FOR THE PRODUCTION OF POLY(DIORGANOSILOXANES) WITH DIORGANYLOXYORGANYLSILYL OR TRIORGANYLOXYSILYL END GROUPS, CROSSLINKABLE MIXTURES CONTAINING THEM AND USE THEREOF

[75] Inventors: Robert Friebe; Karl-Heinz Sockel, both of Leverkusen, Germany

[73] Assignee: Bayer Aktiengesellschaft, Leverkusen, Germany

[21] Appl. No.: 709,950

[22] Filed: Sep. 9, 1996

[30] Foreign Application Priority Data

Sep. 13, 1995 [DE] Germany .................. 195 33 915.0

[51] Int. Cl.$^6$ .................................... C08G 77/08
[52] U.S. Cl. ................................ 528/23; 528/901
[58] Field of Search ........................ 528/23, 901

[56] References Cited

U.S. PATENT DOCUMENTS

| | | |
|---|---|---|
| 3,161,614 | 12/1964 | Brown et al. . |
| 3,296,165 | 1/1967 | Kemp . |
| 3,364,160 | 1/1968 | Gölltz et al. . |
| 4,147,855 | 4/1979 | Schiller et al. ............... 528/23 |
| 4,657,978 | 4/1987 | Wakabayashi et al. . |
| 4,705,826 | 11/1987 | Weber et al. . |
| 4,727,127 | 2/1988 | Suzuki ........................ 528/23 |
| 4,748,166 | 5/1988 | Gautier et al. . |
| 5,196,497 | 3/1993 | Weber et al. . |
| 5,352,751 | 10/1994 | Cocco . |
| 5,371,165 | 12/1994 | Patrick et al. ............... 528/23 |

FOREIGN PATENT DOCUMENTS

| | | |
|---|---|---|
| 0069256 | 1/1983 | European Pat. Off. . |
| 0070786 | 1/1983 | European Pat. Off. . |
| 0098369 | 1/1984 | European Pat. Off. . |
| 0137883 | 2/1989 | European Pat. Off. . |
| 1582800 | 11/1977 | Germany . |
| 918823 | 2/1963 | United Kingdom . |
| 9501983 | 1/1995 | WIPO . |

OTHER PUBLICATIONS

DIN 53504, Determination of tensile strength at break, tensile strength, elongation at break and stress values in a tensile test, pp. 1–5, (Mar. 1985).

DIN 53505, Testing of Elastomers Shore A and D Hardness Testing, pp. 1–4, (Aug. 1973).

Primary Examiner—Melvyn I. Marquis
Attorney, Agent, or Firm—Sprung Kramer Schaefer & Briscoe

[57] ABSTRACT

In the production of a poly(diorganosiloxane) with diorganyloxyorganylsilyl or triorganyloxysilyl end groups wherein at least one α,ω-dihydroxypoly(diorganosiloxane) is reacted with at least one alkoxysilane in the presence of a catalyst, the improvement which comprises employing as the catalyst at least one phosphoric acid ester or salt thereof. The reaction proceeds rapidly and, when complete, the catalyst can easily be deactivated to prevent degradation and/or rearrangement.

10 Claims, No Drawings

PROCESS FOR THE PRODUCTION OF POLY(DIORGANOSILOXANES) WITH DIORGANYLOXYORGANYLSILYL OR TRIORGANYLOXYSILYL END GROUPS, CROSSLINKABLE MIXTURES CONTAINING THEM AND USE THEREOF

The present invention relates to a process for the production of poly(diorganosiloxanes) with diorganyloxyorganylsilyl or triorganyloxysilyl end groups by reacting α,ω-dihydroxypoly(diorganosiloxanes) with at least one alkoxysilane in the presence of at least one catalytically active phosphoric acid ester, to cross-linkable mixtures containing poly(diorganosiloxanes) with diorganyloxyorganylsilyl or triorganyloxysilyl end groups and to the use thereof.

Several processes are already known for the production of the polymers according to the invention or of formulations containing such polymers. These polymers are used inter alia for the production of single component silicone pastes, hereinafter known as RTV-1 (room temperature vulcanizing single component) alkoxy systems, which may be stored with exclusion of moisture and cure on exposure to atmospheric moisture with elimination of alcohols to yield elastomers.

The following fundamental pathways are described in the literature:

1. Reaction of α,ω-dihydroxypoly(diorganosiloxanes) with alkoxysilanes in the presence of catalysts and
2. reaction of α,ω-dihydroxypoly(diorganosiloxanes) with alkoxysilanes of mixed functionality.

In the first pathway, known catalysts are principally amines (EP-A-21 859, EP-A-69 256), amines mixed with metal carboxylates (U.S. Pat. No. 3,161,614) together with amines mixed with Lewis acids (EP-A-137 883), ammonium carbamates, preferably $(CH_3)_2NH_2OCON(CH_3)_2$ (DE-PS 3 523 206) and hydroxylamine derivatives (EP-A-70 786).

Long reaction times and elevated temperatures are, however, necessary for these described catalysts or catalyst systems. The catalysts must moreover be used in substantial quantities so that removing them from the alkoxysilane end-stopped polymer is generally difficult or even completely impossible.

It proved possible to overcome a range of these disadvantages by using alkali metal hydroxides as the catalysts (DE-OS 4 022 661, EP-A-457 693). However, the extreme activation of the alkoxysilanes by the hydroxide or alkoxide ions brings about unwanted secondary reactions which relate to polymer degradation and polymer rearrangement reactions. This renders it necessary to deactivate the catalyst as quickly as possible upon completion of the desired end-stopping reaction.

In the second pathway, the alkoxysilanes of mixed functionality which are used are, unlike pure triorganyloxy or diorganyloxyorganosilanes, sufficiently reactive to react with the α,ω-dihydroxypoly(diorganosiloxanes) even without the use of catalysts. Thus, for example, DE-PS 1 247 646 describes alkoxyamidesilanes, U.S. Pat. No. 3,296,165 describes alkoxyacetoxysilanes and EP-A-98 369 describes alkoxyoximesilanes. However, production of these mixed alkoxysilanes is costly and the removal of the cleavage products from the polymers or the corresponding RTV-1 compositions is difficult or impossible.

Principally on economic grounds, the reaction of α,ω-dihydroxypoly(diorganosiloxanes) with alkoxysilanes in the presence of suitable catalysts is preferable to the last-stated process.

The object of the present invention is thus to provide a process for reacting α,ω-dihydroxypoly(diorganosiloxanes) with alkoxysilanes which allows the production of poly(diorganosiloxanes) with diorganyloxyorganylsilyl or triorganyloxysilyl end groups after a short reaction time even at room temperature.

It has surprisingly now been found that the reaction of α,ω-dihydroxypoly(diorganosiloxanes) with alkoxysilanes in the presence of phosphoric acid esters gives rise to alkoxy end-stopped poly(diorganosiloxanes) within a few minutes even at room temperature.

Although it is known from the literature that phosphoric acid esters, as well as alkali metal hydroxides, exert a degrading action on poly(diorganosiloxanes) (DE-PS 26 53 499), it proved possible, in the presence of the catalysts according to the invention, to react α,ω-dihydroxypoly(diorganosiloxanes) with alkoxysilanes to yield diorganyloxyorganylsilyl or triorganyloxysilyl end-stopped polymers without unwanted polymer degradation reactions occurring during the production process. Surprisingly, it was found that this reaction gives rise to the desired products even under mild conditions at room temperature within short reaction times.

On completion of the desired reaction, the phosphoric acid esters according to the invention may be deactivated by the addition of suitable compounds. This is, however, necessary only in those cases in which rearrangement reactions which impair the product occur due to the action of the phosphoric acid esters according to the invention.

The present invention accordingly provides a process for the production of poly(diorganosiloxanes) with diorganyloxyorganylsilyl or triorganyloxysilyl end groups by the reaction of α,ω-dihydroxypoly(diorganosiloxanes) with at least one alkoxysilane, wherein at least one phosphoric acid ester is used as catalyst.

Any known α,ω-dihydroxypoly(diorganosiloxanes) are suitable for the process according to the invention wherein, for example, the organyl groups are $C_1-C_{18}$ alkyl groups, preferably methyl groups. The methyl groups may be partially replaced by vinyl, phenyl, $C_2-C_8$ alkyl or haloalkyl groups. The poly(diorganosiloxanes) are substantially linear, but may also contain a proportion of organosiloxy units having a branching action. The poly(diorganosiloxane) may moreover be partially substituted by unreactive groups, such as for example trimethylsiloxy groups. In a preferred embodiment of the present invention, the α,ω-dihydroxypoly(diorganosiloxanes) have a viscosity of between 0.1 and 1000 Pa·s, preferably between 10 and 500 Pa·s.

For the purposes of the invention, the alkoxysilane used is an alkoxysilane or a mixture of two or more alkoxysilanes of the formula (I)

in which $R^1$ is an optionally substituted $C_1-C_6$ alkyl, $C_2-C_8$ alkoxyalkyl or $C_5-C_7$ cycloaliphatic hydrocarbon radical, $R^2$ is an optionally substituted $C_1-C_{10}$ alkyl, $C_2-C_{10}$ alkenyl, phenyl or substituted phenyl radical, and n is 0, 1 or 2.

Particularly preferred alkoxysilanes are tetraethoxysilane, tetramethoxysilane, methyltrimethoxysilane, methyltriethoxysilane, vinyltriethoxysilane, vinyltriisopropoxysilane and/or vinyltrimethoxysilane.

Alkoxysilanes substituted on the alkyl group are also suitable, such as for example

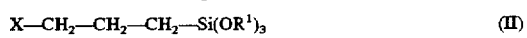

where

X is HS—, H$_2$N—, R$_2$N—, H$_2$NCH$_2$CH$_2$NH—, Cl— or other substituent.

Some of these compounds, for example the aminoalkylalkoxysilanes, react with the α,ω-dihydroxypoly (diorganosiloxanes) even without the catalysts according to the invention, but reaction times may be shortened or reaction temperatures lowered by the presence of the catalysts according to the invention, which creates advantages during further processing of the products.

Partially hydrolyzed alkoxysilanes may also be used in the process according to the invention.

α,ω-Dihydroxypolydiorganosiloxane and alkoxysilane are preferably used in an at least equimolar ratio relative to the SiOH content.

For the purposes of the invention, the catalysts used are preferably at least one ester of orthophosphoric acid of the following formula (III)

$$O=P(OR^3)_{3-m}(OH)_m \quad (III),$$

where m is 0, 1 or 2, preferably 1,

R$^3$ is an optionally substituted linear or branched C$_1$–C$_{30}$ alkyl, C$_2$–C$_{30}$ alkenyl or alkoxyalkyl, C$_5$–C$_{14}$ cycloalkyl or aryl radical or a triorganylsilyl or diorganylalkoxysilyl radical, which may be identical or different within a molecule, and/or at least one ester of polyphosphoric acid.

Orthophosphoric acid may also be present in addition to the orthophosphoric acid esters and/or polyphosphoric acid esters.

In a preferred embodiment of the present invention, the phosphoric acid esters are orthophosphoric acid esters having at least one optionally substituted linear or branched C$_4$–C$_{30}$ alkyl radical R$^3$.

Particularly preferred phosphoric acid esters are primary and secondary esters of orthophosphoric acid such as dibutyl phosphate, di-(2-ethylhexyl) phosphate, dihexadecyl phosphate, diisononyl phosphate, monoisodecyl phosphate, mono-(2-ethylhexyl) phosphate and di-(trimethylsilyl) phosphate together with tertiary esters, such as tris-(trimethylsilyl) phosphate, tributyl phosphate and trioctyl phosphate, which may be used individually or as a mixture.

It is also possible to use esters of polyphosphoric acid or mixtures of two or more polyphosphoric acid esters and/or orthophosphoric acid esters. Acidic or neutral salts of ortho- and polyphosphoric acid esters, such as for example alkali metal salts, are also usable.

The quantity of the phosphoric acid ester is dependent upon the α,ω-dihydroxypoly(diorganosiloxane) used and the alkoxysilane. These are preferably used in concentrations of 0.1–5%, preferably of 0.5–2%, relative to the complete mixture.

In a preferred embodiment of the present invention, once the alkoxy end-stopped polymers have been produced, the acidic phosphoric acid esters are deactivated by suitable compounds, in order to avoid unwanted degradation of the polymers.

Deactivation may be achieved by neutralization, complexation or other reactions. Any strong or weak base is suitable for deactivation of the phosphoric acid esters, such as an alkali metal hydroxide or a silanolate or alkoxide thereof, a tetraalkylammonium hydroxide or amine. Examples of such substances are sodium hydroxide, potassium methanolate, tetramethylammonium hydroxide, triethylamine and hexamethyldisilazane. Metal oxides, sulphates, silicates, carbonates and hydrogen carbonates are also suitable. Precipitated and/or ground chalks are preferably used here.

Depending upon the desired degree of end-stopping and the reactivity of the alkoxysilane used, the process according to the invention is performed at temperatures to 100° C., preferably of 15° to 60° C., particularly preferably of 18° to 40° C., very particularly preferably at room temperature. The reaction time is here at least 3 minutes, preferably 5 to 30 minutes.

The present invention also provides crosslinkable mixtures containing poly(diorganosiloxanes) with diorganyloxyorganylsilyl or triorganylsilyl end groups, which are produced and deactivated using the process according to the invention, together with catalysts and optionally fillers, plasticizers and other additives.

For the purposes of the invention, fillers are, for example, reinforcing fillers, such as pyrogenic silica and carbon black, semi-reinforcing fillers, such as for example precipitated chalk and precipitated silica, non-reinforcing fillers, such as ground natural chalk, silica flour, metal silicates, carbonates, oxides and sulphates which are insoluble in water, the fillers optionally being surface modified.

For the purposes of the invention, plasticizers are, for example, polydimethylsiloxanes with trimethylsiloxy end groups and a viscosity of 0.1 to 5 Pa·s.

For the purposes of the invention, suitable catalysts are any prior art catalysts customary in condensation-crosslinking polysiloxane compositions. Organic titanium and tin compounds are particularly preferred. Particularly preferred tin compounds are, for example, diorganotin dicarboxylates, such as dibutyltin laurate and dioctyltin maleate, together with solutions of diorganotin oxides in silicic acid esters. Preferred titanium compounds are, for example, alkyl titanates, such as tetraisopropyl titanate, tetrabutyl titanate and chelated titanium compounds, such as diisobutyl-bis-acetoacetic acid ethyl ester titanate.

For the purposes of the invention, further additives are, for example, adhesion promoters, pigments and fungicides. Preferred adhesion promoters are organo-functional silanes of the formulae:

$$X-CH_2-CH_2-CH_2-Si(OR^1)_3$$

where X is —NH—CH$_2$—CH$_2$—NH$_2$,

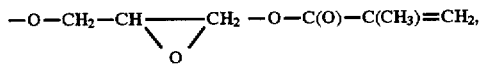

—SH, —OH or —Cl, and wherein

R$^1$ has the above-stated meaning.

The crosslinkable mixture according to the invention is produced by homogeneously mixing the chain extended α,ω-dihydroxypolydiorganosiloxanes with the additionally required components.

The crosslinkable mixtures according to the invention are produced by homogeneously mixing the poly (diorganosiloxanes) with diorganyloxyorganylsilyl or triorganylsilyl end groups with the additionally required components.

The RTV-1 compositions may be produced in any conventional prior art mixing units, such as for example planetary mixers, high speed mixers, butterfly mixers or continuously operated mixing screws.

The present invention also provides the use of the poly (diorganosiloxanes) with diorganyloxyorganylsilyl or triorganyloxysilyl end groups produced using the process according to the invention for the production of RTV-1 compositions.

The following examples illustrate the invention, but do not limit it thereto.

EXAMPLES

Production of alkoxy end-stopped poly (diorganosiloxanes)

In order to test end-stopping, the reaction products from the examples were investigated as follows:

1. viscosity measurements with a Haake rotational viscosimeter and
2. crosslinking test.

In the crosslinking test mentioned above in 2, 2.0 parts by weight of the mixture to be tested were mixed with 0.1 part by weight of tetraisopropyl titanate. If a rapid increase in viscosity, accompanied by strong gelling of the mixture, is observed after addition of the titanate, this is taken as an indication of incomplete conversion of the SiOH groups of the α,ω-dihydroxypolydiorganosiloxane used. If such behavior is not observed and the material cures to yield an elastomer on exposure to atmospheric moisture, it is concluded that end-stopping is complete.

General procedure for the production and evaluation of RTV-1 compositions

The RTV compositions were produced in a 1 liter planetary mixer in accordance with the following examples. On completion of production, the compositions were transferred into plastic cartridges. Material for the further tests was taken from the sealed cartridges.

The crosslinking behavior of the polysiloxane compositions was tested on a glass plate, for which purpose the pastes were applied in a layer thickness of 2 mm to an area of 40×60 mm. After 24 hours, the layer of material was cut, peeled off by hand and the underneath surface felt in order to determine whether the layer had cured through to the surface of the glass.

The mechanical properties of the vulcanizates were determined by sheeting out the pastes to a thickness of 2 mm and testing them according to DIN 53 504 after 14 days' curing at 23° C. and 50% relative humidity. Hardness was tested according to DIN 53 505 after 14 days.

Example 1

100.0 parts by weight of a polydimethylsiloxane with $Si(CH_3)_2OH$ end groups, which had a viscosity of 50 Pa·s at 25° C., was mixed with 1.0 part by weight of methyltrimethoxysilane and 0.72 part by weight of di-2-ethylhexyl phosphate were added. The viscosity of the mixture was 49.3 Pa·s after production. After waiting for 11 minutes, the crosslinking test was performed. No gelling could be observed. 0.23 part by weight of triethylamine was added and the viscosity determined again after 2.5 hours, giving a value of 49.3 Pa·s. It is concluded from the results that end-stopping is complete.

Example 2

A similar method was used as in Example 1, wherein, however, 0.4 part by weight of dibutyl phosphate were used. Initial viscosity was measured at 52.1 Pa·s. After waiting 12 minutes, the crosslinking test was negative, i.e. no gelling could be observed. After neutralization with triethylamine, a value of 60.4 was measured after 69 minutes and of 58.6 Pa·s after a further 2 days. The results confirm successful end-stopping, without occurrence of unwanted polymer degradation (no reduction in viscosity).

Example 3

A similar method was used as in Example 1 and 1.1 parts by weight of vinyltrimethoxysilane was used as the alkoxysilane and 0.72 part by weight of di-2-ethylhexyl phosphate was used as the catalyst. Initial viscosity was measured at 51.1 Pa·s. After waiting 8 minutes, the crosslinking test was negative. After neutralization with 0.36 part by weight of hexamethyldisilazane, viscosity was determined at 51.1 Pa·s after 1 day.

Example 4

A similar method was used as in Example 1 and 1.4 parts by weight of vinyltriethoxysilane and 0.72 part by weight of di-2-ethylhexyl phosphate were used. After waiting 9 minutes, the crosslinking test was negative, i.e. no gelling could be observed. Neutralization was then performed with 0.36 part by weight of hexamethyldisilazane.

Comparative Example 5

A similar method was used as in Example 1, but the catalyst was dispensed with. The mixture gelled very strongly in the crosslinking test, from which it is concluded that end-stopping was incomplete. The test shows that, when the catalysts according to the invention are not used, the alkoxysilane does not react with the α,ω-dihydroxypoly (diorganosiloxane).

Comparative Example 6

A similar method was used as in Example 1, wherein, however, the catalyst was not neutralized. After waiting 11 minutes, no gelling was found in the crosslinking test. Initial viscosity was measured at 49.3 Pa·s. After 1 hour, the viscosity was 0.2 Pa·s. The test shows that, unless the di-2-ethylhexyl phosphate is neutralized, severe polymer degradation occurs. The material no longer cures and is unsuitable for the production of RTV-1 compositions.

Examples 7 to 9

These examples show that RTV-1 compositions may be produced in a single vessel using the process according to the invention.

55 parts by weight of a polydimethylsiloxane with $Si(CH_3)_2OH$ end groups, which had a viscosity of 80 Pa·s at 25° C., were introduced into a planetary mixer with 29.0 parts by weight of a polydimethylsiloxane with —OSi $(CH_3)_3$ end groups and a viscosity of 100 mPa·s at 25° C. The alkoxysilane and catalyst were then added in the quantities stated in Table 1 and the crosslinking test performed after waiting 10 minutes. No gelling was observed in any of the tests which were performed, from which it is concluded that end-stopping was successful. Neutralization was then performed by adding the amine listed in Table 1. 9.5 parts by weight of a hydrophobic silica with a BET surface area of 150 m²/g were then mixed in and 0.75 part by weight of tetraisopropyl titanate added. The compositions produced in this manner were used in further testing.

The pastes cured completely within 24 hours to yield elastomers. Further testing was performed in accordance with the stated methods and the results are set forth in Table 1.

TABLE 1

Test results from Examples 7 to 9 (figures in parts by weight)

| Example | 7 | 8 | 9 |
|---|---|---|---|
| Vinyltrimethoxysilane | 2.5 | 2.5 | 2.5 |
| Di-(2-ethylhexyl) phosphate | 0.36 | — | — |
| Mono-(2-ethylhexyl) phosphate | — | 0.3 | 0.5 |
| Triethylamine | 0.11 | — | — |
| Hexamethyldisilazane | — | 0.23 | 0.38 |

TABLE 1-continued

| Test results from Examples 7 to 9 (figures in parts by weight) | | | |
|---|---|---|---|
| Testing per DIN 53 505 | | | |
| Hardness [Shore A] | 16 | 16 | 15 |
| Testing per DIN 53 504 | | | |
| Tensile strength [MPa] | 1.25 | 1.75 | 1.76 |
| Elongation at break [%] | 685 | 704 | 811 |
| Tensile stress [MPa] (at 100% elongation) | 0.26 | 0.22 | 0.20 |

It will be understood that the specification and examples are illustrative but not limitative of the present invention and that other embodiments within the spirit and scope of the invention will suggest themselves to those skilled in the art.

We claim:

1. In a process wherein at least one α,ω-dihydroxypoly (diorganosiloxane) is reacted with at least one alkoxysilane in the presence of a catalyst to produce a poly (diorganosiloxane) with diorganyloxyorganylsilyl or triorganyloxysilyl end groups, the improvement which comprises employing at least one phosphoric acid ester as said catalyst.

2. A process according to claim 1, wherein the α,ω-dihydroxypoly(diorganosiloxane) has a viscosity of between 0.1 and 1000 Pa·s.

3. A process according to claim 1, wherein the alkoxysilane comprises at least one member selected from the group consisting of methyltrimethoxysilane, methyltriethoxysilane, vinyltriethoxysilane, vinyltriisopropoxysilane, vinyltrimethoxysilane, tetraethoxysilane and tetramethoxysilane.

4. A process according to claim 1, wherein the catalyst comprises at least one member selected from the group consisting of a) an ester of orthophosphoric acid of the formula

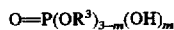
$$O=P(OR^3)_{3-m}(OH)_m$$

where m is 0, 1 or 2 and

R³ is an optionally substituted linear or branched $C_1$–$C_{30}$ alkyl, $C_2$–$C_{30}$ alkenyl or alkoxyalkyl, $C_5$–$C_{14}$ cycloalkyl or aryl radical or a triorganylsilyl or diorganylalkoxysilyl radical, which may be identical or different within a molecule, and b) an ester of polyphosphoric acid.

5. A process according to claim 1, wherein the catalyst comprises at least one member selected from the group consisting of dibutyl phosphate, di-(2-ethylhexyl) phosphate, dihexadecyl phosphate, diisononyl phosphate, monoisodecyl phosphate, mono-(2-ethylhexyl) phosphate, di-trimethylsilyl) phosphate, tris-(trimethylsilyl) phosphate, a tert ester of orthophosphoric acid, and a salt thereof.

6. A process according to claim 1, wherein the catalyst is used in a quantity of 0.1–5% relative to the complete mixture.

7. A process according to claim 1, wherein the catalyst is deactivated when the desired reaction is substantially complete and before rearrangement reactions occur which impair the product.

8. A process according to claim 5, wherein the α,ω-dihydroxypoly(diorganosiloxane) has a viscosity of between 0.1 and 1000 Pa·s, the alkoxysilane comprises at least one member selected from the group consisting of methyltrimethoxysilane, methyltriethoxysilane, vinyltriethoxysilane, vinyltriisopropoxysilane, vinyltrimethoxysilane, tetraethoxysilane and tetramethoxysilane, the phosphoric catalyst is used in a quantity of 0.1–5% relative to the complete mixture, and the catalyst is deactivated when the desired reaction is substantially complete and before rearrangement reactions occur which impair the product.

9. A process for preparing RTV compositions wherein a poly(diorganosiloxane) with diorganyloxyorganylsilyl or triorganyloxysilyl end groups is prepared by reacting at least one α,ω-dihydroxypoly(diorganosiloxane) with at least one alkoxysilane in the presence of at least one phosphoric acid ester of the formula

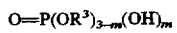
$$O=P(OR^3)_{3-m}(OH)_m$$

wherein m is 1, or 2 and

R³ is an optionally substituted linear or branched $C_1$–$C_{30}$ alkyl, $C_2$–$C_{30}$ alkenyl or alkoxyalkyl, $C_5$–$C_{14}$ cycloalkyl or aryl radical or a triorganylsilyl or diorganylalkoxysilyl radical, which may be identical or different within a molecule, and combining said poly(diorganosiloxane) with additives to form an RTV composition.

10. The process of claim 9, wherein said additives are selected from the group consisting of catalysts, fillers, plasticizers, adhesion promoters, pigments, fungicides, and combinations thereof.

* * * * *